May 5, 1953     H. L. KAMMERDIENER     2,637,843
GROUND DETECTOR AND PROTECTIVE SYSTEM

Filed Feb. 7, 1950

INVENTOR
HAROLD L. KAMMERDIENER

BY Gustave Miller.
ATTORNEY

Patented May 5, 1953

2,637,843

UNITED STATES PATENT OFFICE 2,637,843

GROUND DETECTOR AND PROTECTIVE SYSTEM

Harold L. Kammerdiener, Cadogan, Pa.

Application February 7, 1950, Serial No. 142,883

1 Claim. (Cl. 340—255)

This invention relates to an electrical protective system particularly intended for use in protecting mining equipment and cables, but is also intended for use wherever else similar conditions may exist.

It is an object of this invention to provide an electrical protective system particularly intended for use with heavy electrical equipment and electrical cables used in connection with such equipment wherein high voltages and high amperage are used, to prevent damage to either the equipment or to the cable in case of a short circuit, to actuate signaling means when a short circuit does occur and meantime limit the current through the short to a safe amount, and to cooperate with detection means in finding the exact location of the short circuit if in the cable, or in ascertaining that the short circuit is in the equipment and not in the cable.

A further object of this invention is to provide an electrical protective system for use in connection with high voltage direct current electrical equipment and cables.

A further object of this invention is to provide an electrical protective system for use with electrical equipment and cables using direct current, wherein the voltage normally used is around 500 volts and the current used is around 200 amperes, which will limit the current to a safe amount in case of a short circuit, cause such short circuit to actuate an alarm or signal, and cooperate with conventional detecting means in finding the exact location of the short circuit.

Still a further object of this invention is to provide an electrical protective system which cooperates with the conventional type of direct current mining equipment and the conventional direct current cable, which includes a positive conductor, a negative conductor and mechanical grounding ribbon conductor located within the cable and between the positive and negative conductors.

A further object of this invention is to eliminate the hazards of short circuits in the cable or the mining equipment from causing arcing and explosions of mining gases too often present in coal mines particularly.

Still a further object of this invention is to provide an electrical protective system which may be added to existing electrical mining equipment and electrical cables without any modification whatsoever of either the electrical mining equipment or the cable.

Figure 1:
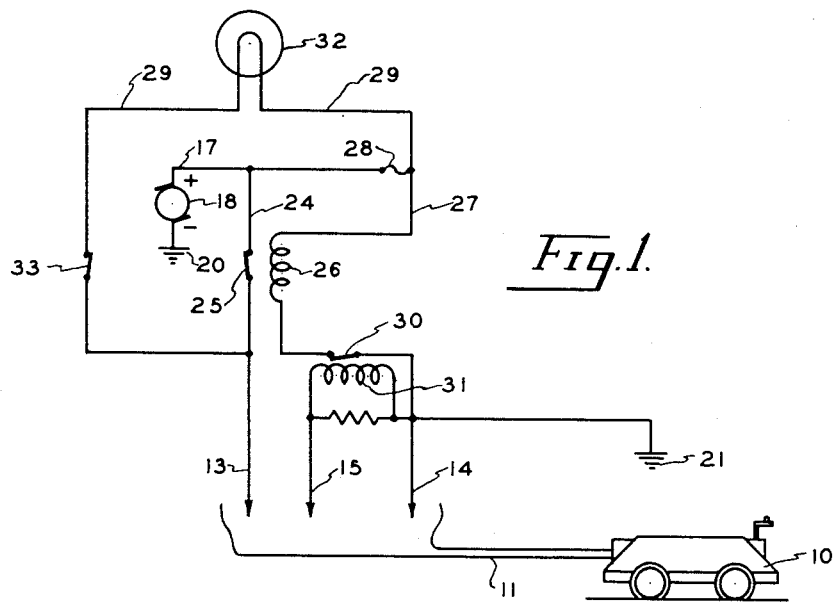
Figure 2:
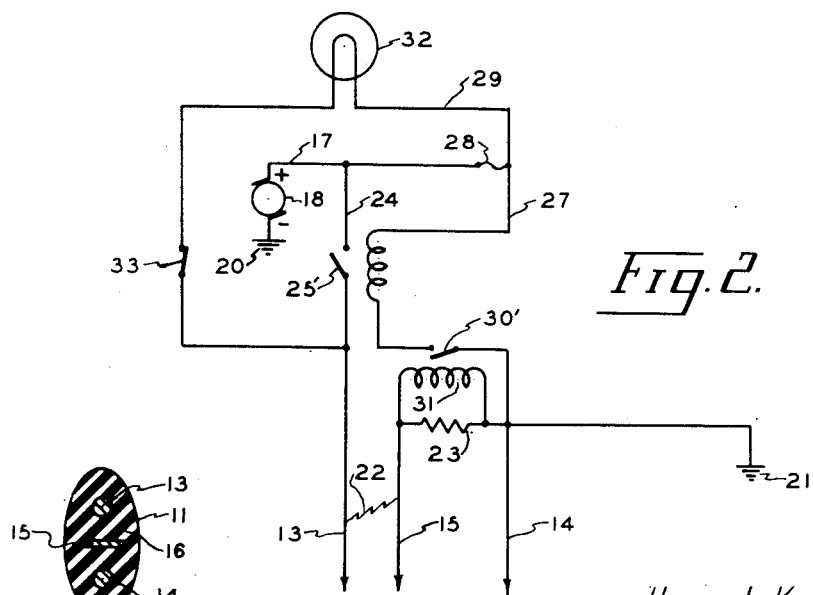
Figure 3:
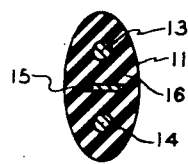

With the foregoing and other objects in view, this invention comprises the combinations, constructions and arrangement of parts and circuits hereinafter set forth, claimed, and illustrated in the accompanying drawing, wherein Fig. 1 is a diagrammatic view of the electrical protective system as in operation when the electrical equipment is in operation, and no short circuit is present, Fig. 2 shows the electrical protective system as in operation after a short circuit has developed, and Fig. 3 is a cross-section of the conventional cable normally used.

This invention is principally intended for use with heavy duty direct current operated mining equipment. Such equipment may be a locomotive, drill, cutter or the like located within the depths of the mine and connected to its direct current power source by an expensive heavy trailing cable up to a thousand feet or more in length, or may be heavy equipment fixed in location, as at the head of the mine, and connected by a similar cable of suitable length to the direct current power source. With such heavy equipment, it is necessary and customary to use high voltages running around five hundred and fifty volts and direct current of about two hundred amperes. With such voltage and current, any short circuit in either the equipment or the cable is capable of causing severe and expensive damage to the equipment and the cable, and in addition, is a hazard to life, and such short circuits readily cause explosions within the cable and equipment, ruining the same, as well as setting off explosions in the mine of mine gases, killing and injuring personnel present and damaging the mining, additionally causing severe loss of production.

Furthermore, even though the short circuit may only be a minor one initially, it is often difficult or impossible to detect the location of the short, necessitating discarding the cable or equipment and a loss of production until new cable and equipment are provided in order to prevent the minor short circuit from developing into an explosively dangerous one. With this invention, the short circuit is kept to a safe amperage, and automatically reduces the current to a small amount, insufficient to cause further damage, meanwhile operating a signal to show a short is present, and thereafter cooperating with conventional detecting equipment in ascertaining the exact location of the short, if in the cable, or that the short is in the equipment.

There is shown at 10 a diagrammatic representation of a piece of heavy mining equipment connected by a conventional three conductor cable 11 to a direct power source. This cable, as shown in Fig. 3, consists of a positive conductor 13, and a negative conductor 14, both of circular cross section, and a mechanical ground ribbon shaped conductor 15 of at least equal cross sectional area located in between the conductors 13 and 14 within the cable and separated from each of them by the cable insulation 16.

The positive conductor 13 connects the positive side 17 of the D. C. power source 18, whose negative side is grounded at 20, to the positive side of the mining equipment 10. The negative conductor 14 is connected to the negative side of the mining equipment 10 and to ground at 21 thus completing the circuit. The mechanical ground ribbon conductor 15, whose cross sectional area is usually equal to that of the electrical conductors 13 and 14, is connected to the frame of the mining equipment 10 at one end and its other end is usually connected direct to ground.

While many types of circuit breakers or fuses have been tried between the end of the cable 11 and the power source 18, none of them have been completely satisfactory, often failing to operate when a minor short circuit first develops and permitting such short circuit to grow to a heavy short circuit and cause damage before the power is shut off from the equipment.

When a short circuit first develops, either in the cable 11 as shown at 22, or in the mining equipment to its frame, the short is captured by the mechanical ground conductor 15, due to the fact that the frame is grounded to this conductor 15, or if in the cable, due to the fact that the width of the ribbon ground conductor 15 is greater than the diameter of either electrical conductor 13 and 14. The ground conductor 15 is connected by a resistor 23 of suitable size to the ground at 21. The size of the resistor 23 is such that it limits the current that flows therethrough to ground to a safe amperage so that the short circuit 22 is limited and does not take the full two hundred amperes that may be initially present.

The electrical protective system of this invention includes a connection 24 across a conventional type of gravity and spring release switch 25 which remains in a circuit-breaking, open position except when it is held closed by means of a solenoid 26. This solenoid 26 is in a connection 27 from the positive side 17 of the power source 18 through a small fuse 28 on one side, and through a switch 30 to ground 21, the switch 30 being in normally closed or circuit completing position except when it is opened by a solenoid 31. This switch 30 is of an adjustable delayed action conventional type, which, when operated, may take about one second to open. Also connected across the fuse 28 from the positive side 17 of power source 18 is an indicator lamp alarm signal 32 connected by 29 then through a manually openable switch 33 to the positive conductor 13.

In operation, the electrical protective system of this invention appears as in Fig. 1 when the equipment 10 is using power and there is no short circuit or fault present. The positive current goes from power source 18 through its positive side 17, through fuse 28 and solenoid coil 26 in connection 27, across closed switch 30 to ground 21 and thus back to ground 20 of power source 18. Solenoid 26, with the current flowing therethrough, operates switch 25 to close the connection 24 from the positive side 17 of power source 18 to the positive conductor 13 and thus to the mining equipment 10, then through negative conductor 14 to ground 21 and thus to ground 20 of power source 18. So long as no short develops, the solenoid coil 26 will keep the switch 25 in closed position, and no current will flow through the lamp or signal 32 due to its resistance.

However, if and when a short 22 develops in the cable, as shown in Fig. 2, or in the mining equipment 10, the short will connect to the mechanical ground ribbon connector 15, whether in the cable as shown, or through the grounded frame of the mining equipment 10. From the ground conductor 15, the current will flow through the limiting resistor 23 to the ground 21, and also flow through the solenoid coil 31. Due to the resistance of the resistor 23, the amount of current that can flow across the short circuit 22 is limited to such a safe amount that no arcing or sparking or further breakdown in the insulation 16 or in the mining equipment will occur. When the solenoid coil 31 is energized, it will open the switch 30 to the position 30', taking about one second to do so, due to the switch having had its action so adjusted. When switch 30 is in opened position 30', the solenoid coil 26 becomes dead, thereby permitting the gravity and spring actuated switch 25 to move to opened position 25', interrupting the current to the mining equipment 10 or the short 22 through the connection 24 and positive conductor 13. With the connection 24 thus interrupted, the current in connection 29 will overcome the resistance of the lamp or signal 32, causing it to light up or give an alarm, as it completes its circuit through the closed switch 33 and positive conductor 13 through short circuit 22 and ground conductor 15 to resistor 23 and also in parallel through solenoid coil 31 to the ground 21. The value of the current flowing is small, being limited by the lamp of signal 32, but is of sufficient power to keep solenoid coil 31 energized thus keeping switch 30 open in position 30', keeping solenoid coil 26 de-energized and keeping switch 25 in open position 25' cutting off the current to the short circuit 22 and limiting the current to the short 22 to the amount that can pass the lamp or signal 32, while the main power supply to the mining equipment is thus cut off.

When the attendant observes that the lamp or signal is in operation, he first opens switch 33, cutting off the current to the signal or lamp 32. This has the effect of interrupting the current to the solenoid coil 31, permitting the delayed action switch 30 to close, completing the circuit through the solenoid coil 26 to ground 21 and thereby closing switch 25 again. The current then flows through connection 24 and closed switch 25 to positive cable 13, the short circuit 22, re-energizes solenoid coil 31 to ground 21, thereby again opening switch 30 to position 30' after the delay of about one second for which it is adjusted. As soon as switch 30 is opened, the current to solenoid coil 26 is again broken, switch 25 opens, breaking the current to the solenoid 31 and permitting switch 30 to again close after one second, repeating the cycle indefinitely until the power source is disconnected by any main switch (not shown).

When the manual switch 33 has been opened, and the cycle of the power going on and off once a second, the direct current through the short circuit thereby becomes a fluctuating current, creating and discontinuing magnetic lines of force along the length of the cable that are capable of being detected either by a compass or by any conventional fluctuating current detector coil. The attendant then takes such a compass or detector coil in his hand, and walks alongside the cable 11 as far as the compass or detector coil indicates current is flowing. When it ceases to so indicate, he knows he has reached the location of the short circuit. If in the cable, he marks the cable accordingly, as by tieing a marker about the cable at the spot, and if it does not show up in the length of the cable, he knows it is in the mining equipment 10, and he puts such piece of mining equipment out of service until it can be repaired. Having thus found the short circuit, he operates the main switch (not shown) to disconnect the power source until suitable repairs have been made to the cable or mining equipment.

The electrical protective system of this invention is thus operative to permit normal operation of the equipment, to disconnect the main power to the mining equipment when there is even a very minor short circuit present in either the equipment or the power cable, to limit the amount of current through the short circuit to a safe amount and cause it to operate a lamp or signal showing the short circuit is present, and then, to cause the direct current through the short circuit to fluctuate slowly so that it will not harm the solenoids of the system and so that its fluctuations can be readily detected by conventional means to thus spot the location of the short circuit.

While the preferred form of this invention has been thus set forth and disclosed, it will be understood that this invention is not limited to the particular system heretofore disclosed, but that changes and modifications may be made in the system within the scope of what is hereinafter claimed.

Having thus set forth the nature of this invention, what is claimed is:

An electrical protective system for high voltage, high current, direct current electrical equipment and a three conductor cable wherein the cable has a positive and a negative conductor and an intermediate mechanical ground conductor grounded to the frame of the electrical equipment, said system including a first circuit from a direct power source through a first solenoid coil through a normally closed delayed action opening switch back to the power source, a second circuit from the power source through a normally open switch arranged to be held closed by said first solenoid coil when energized, to the positive conductor of the cable to the mining equipment and back through the negative conductor to the power source, a resistor connecting such ground conductor back to the power source, a second coil connecting such ground conductor to the power source in parallelism with said resistor, said second coil being arranged, when energized, to actuate said delayed action opening switch to open position and thereby de-energize said first solenoid coil and thus break said second circuit from the power source to the electrical equipment, and a third circuit including a signal means and a normally closed openable switch, said third circuit connecting said power source to said second circuit beyond its said normally open switch and effective when such switch has been permitted to open by de-energization of said first coil, whereby, when a short circuit develops, it is caught by the mechanical ground conductor and led through the resistor to the power source, and also through said second coil, energizing said second coil and to open and hold open said delayed action switch, de-energizing said first coil and permitting said first switch to open and interrupt said second circuit from the power source to the electrical equipment, thereby effectuating said third circuit to said signal means through said openable switch to the short circuit and through the parallel resistor and said second coil, and when said third circuit openable switch is opened, causing a cyclic opening and closing of said delayed action switch to cause a detectable fluctuating current of limited amount to and through the short circuit.

HAROLD L. KAMMERDIENER.

References Cited in the file of this patent

UNITED STATES PATENTS

| Number | Name | Date |
|---|---|---|
| 1,257,452 | Bowden et al. | Feb. 26, 1918 |
| 1,947,503 | Shunk | Feb. 20, 1934 |
| 2,478,147 | Wilson | Aug. 2, 1949 |